(12) United States Patent
Zheng

(10) Patent No.: US 9,852,183 B2
(45) Date of Patent: Dec. 26, 2017

(54) INFORMATION PROVIDING METHOD AND SYSTEM

(71) Applicant: Alibaba Group Holding Limited, George Town (KY)

(72) Inventor: Nan Zheng, Hangzhou (CN)

(73) Assignee: Alibaba Group Holding Limited (KY)

( * ) Notice: Subject to any disclaimer, the term of this patent is extended or adjusted under 35 U.S.C. 154(b) by 541 days.

(21) Appl. No.: 13/870,696

(22) Filed: Apr. 25, 2013

(65) Prior Publication Data

US 2013/0311451 A1 Nov. 21, 2013

(30) Foreign Application Priority Data

Apr. 26, 2012 (CN) .......................... 2012 1 0126946

(51) Int. Cl.
 *G06F 17/30* (2006.01)
(52) U.S. Cl.
 CPC .. *G06F 17/30483* (2013.01); *G06F 17/30545* (2013.01); *G06F 17/30554* (2013.01); *G06F 17/30864* (2013.01); *G06F 17/30991* (2013.01)
(58) Field of Classification Search
 USPC ................................................ 707/722, 705
 See application file for complete search history.

(56) References Cited

U.S. PATENT DOCUMENTS

| 4,817,050 | A | 3/1989 | Komatsu et al. |
| 6,167,397 | A | 12/2000 | Jacobson et al. |
| 6,766,316 | B2 | 7/2004 | Caudill et al. |
| 6,785,671 | B1 | 8/2004 | Bailey et al. |
| 6,963,867 | B2 | 11/2005 | Ford et al. |
| 7,127,416 | B1 * | 10/2006 | Tenorio ................... G06Q 30/06 705/26.62 |
| 7,451,130 | B2 | 11/2008 | Gupta et al. |
| 7,519,595 | B2 | 4/2009 | Solaro et al. |

(Continued)

FOREIGN PATENT DOCUMENTS

| JP | 2002032401 | 1/2002 |
| JP | 2003186912 | 7/2003 |

(Continued)

OTHER PUBLICATIONS

The Chinese Office Action mailed Dec. 12, 2012 for Chinese patent application No. 200910211788.X, a counterpart foreign application of U.S. Appl. No. 12/992,399, 10 pages.

(Continued)

*Primary Examiner* — Miranda Le
(74) *Attorney, Agent, or Firm* — Van Pelt, Yi & James LLP

(57) ABSTRACT

Embodiments of the present application relate to an information providing method, system and a computer program product. An information providing method is provided. The method includes receiving an information search request including a search condition, forwarding the information search request to a plurality of processing servers to search for information relating to the search condition, determining a merge attribute based on the found information relating to the search condition, the merge attribute having related attribute values, merging the found information based on the determined merge attribute of the found information to obtain search results, and providing the received search results to a user.

18 Claims, 9 Drawing Sheets

(56) References Cited

U.S. PATENT DOCUMENTS

| | | | |
|---|---|---|---|
| 7,523,099 B1 | 4/2009 | Egnor et al. | |
| 7,571,157 B2 | 8/2009 | Chowdhury et al. | |
| 7,617,193 B2 | 11/2009 | Bitan et al. | |
| 7,680,697 B2* | 3/2010 | Hearn | G06Q 30/0603 705/26.62 |
| 7,765,227 B1 | 7/2010 | Khoshnevisan et al. | |
| 7,814,099 B2 | 10/2010 | Wang | |
| 7,904,975 B2* | 3/2011 | Kruglikov | G06Q 10/0631 5/28 |
| 7,921,106 B2* | 4/2011 | Chen | G06F 17/30864 707/723 |
| 7,958,126 B2 | 6/2011 | Schachter | |
| 7,962,477 B2 | 6/2011 | Hu et al. | |
| 8,005,819 B2* | 8/2011 | Vailaya | G06F 17/30675 707/713 |
| 8,060,456 B2 | 11/2011 | Gao et al. | |
| 8,180,768 B2* | 5/2012 | Ceri | G06F 17/30867 707/728 |
| 8,332,428 B2* | 12/2012 | Bonneau | G06F 17/30873 705/26.1 |
| 8,341,147 B2 | 12/2012 | Hu et al. | |
| 8,352,454 B2* | 1/2013 | Falk | G06F 17/30864 707/600 |
| 8,364,670 B2* | 1/2013 | Peckover | G06F 17/3064 707/722 |
| 8,370,332 B2 | 2/2013 | Hu et al. | |
| 8,407,229 B2* | 3/2013 | Yang | G06F 17/30864 707/748 |
| 8,463,805 B2* | 6/2013 | Osborn | G06Q 30/0201 707/705 |
| 8,468,083 B1 | 6/2013 | Szulczewski | |
| 8,583,640 B2 | 11/2013 | Zhang et al. | |
| 8,626,604 B1* | 1/2014 | Gandhi | G06Q 30/0254 705/26.1 |
| 8,626,784 B2* | 1/2014 | Beaudreau | G06F 17/30657 707/759 |
| 8,788,371 B2* | 7/2014 | Parikh | G06F 17/3064 705/27.1 |
| 9,009,164 B2 | 4/2015 | Schachter | |
| 9,031,942 B2* | 5/2015 | Larsson | G06F 17/30943 707/728 |
| 2003/0195877 A1 | 10/2003 | Ford | |
| 2003/0220895 A1 | 11/2003 | Vailaya | |
| 2004/0030690 A1* | 2/2004 | Teng | G06F 17/30864 |
| 2004/0093321 A1 | 5/2004 | Roustant et al. | |
| 2004/0210491 A1* | 10/2004 | Sadri | G06Q 30/02 705/12 |
| 2004/0215607 A1 | 10/2004 | Travis, Jr. | |
| 2005/0010484 A1* | 1/2005 | Bohannon | G06Q 30/06 705/26.5 |
| 2005/0027694 A1 | 2/2005 | Sauermann et al. | |
| 2005/0050023 A1 | 3/2005 | Gosse et al. | |
| 2005/0289158 A1 | 12/2005 | Weiss et al. | |
| 2006/0004891 A1 | 1/2006 | Hurst-Hiller et al. | |
| 2006/0190425 A1* | 8/2006 | Chang | G06F 17/30256 |
| 2006/0212425 A1* | 9/2006 | Stam | G06F 17/30864 |
| 2006/0287980 A1* | 12/2006 | Liu | G06F 17/30864 |
| 2007/0073607 A1* | 3/2007 | Eydelman | G06Q 30/0241 705/37 |
| 2007/0078758 A1* | 4/2007 | Susskind | G06Q 30/08 705/38 |
| 2007/0083506 A1 | 4/2007 | Liddell et al. | |
| 2007/0294225 A1 | 12/2007 | Radlinski et al. | |
| 2007/0294289 A1 | 12/2007 | Farrell | |
| 2008/0010276 A1 | 1/2008 | Morton et al. | |
| 2008/0033915 A1 | 2/2008 | Chen et al. | |
| 2008/0059429 A1* | 3/2008 | Kojima | G06F 17/30566 |
| 2008/0071742 A1* | 3/2008 | Yang | G06F 17/30864 |
| 2008/0104047 A1* | 5/2008 | Nagarajayya | G06F 17/2785 |
| 2008/0140625 A1* | 6/2008 | Chang | G06F 17/30241 |
| 2008/0140641 A1 | 6/2008 | Wang | |
| 2009/0048943 A1* | 2/2009 | Hardigree | G06Q 30/06 705/26.2 |
| 2009/0083243 A1 | 3/2009 | Heymans et al. | |
| 2009/0125505 A1 | 5/2009 | Bhalotia et al. | |
| 2009/0193003 A1 | 7/2009 | Heymans et al. | |
| 2009/0222455 A1* | 9/2009 | Wassmann | G06F 17/30864 |
| 2010/0017398 A1 | 1/2010 | Gupta et al. | |
| 2010/0030769 A1 | 2/2010 | Cao et al. | |
| 2010/0037161 A1 | 2/2010 | Stading et al. | |
| 2010/0082510 A1 | 4/2010 | Gao et al. | |
| 2010/0082618 A1 | 4/2010 | Ott et al. | |
| 2010/0153405 A1* | 6/2010 | Johnson | G06Q 30/06 707/749 |
| 2010/0262602 A1 | 10/2010 | Dumon et al. | |
| 2010/0299222 A1* | 11/2010 | Hamilton, IV | G06Q 30/0601 705/26.1 |
| 2011/0029408 A1* | 2/2011 | Shusterman | G06F 17/30867 705/27.1 |
| 2011/0072023 A1* | 3/2011 | Lu | G06F 17/30616 707/741 |
| 2011/0082770 A1* | 4/2011 | Krishnamoorthy | G06Q 30/08 705/26.64 |
| 2011/0184883 A1* | 7/2011 | El-Charif | G06Q 30/02 705/348 |
| 2012/0078754 A1* | 3/2012 | Wiseman | G06F 17/3087 705/26.61 |
| 2012/0089602 A1* | 4/2012 | Oliver | G06F 17/30286 707/728 |
| 2012/0233001 A1 | 9/2012 | Perkowski et al. | |
| 2013/0060755 A1* | 3/2013 | He | G06Q 30/02 707/722 |
| 2013/0197971 A1* | 8/2013 | Wilke | G06Q 30/0202 705/7.31 |

FOREIGN PATENT DOCUMENTS

| | | |
|---|---|---|
| JP | 2005327225 | 11/2005 |
| WO | 2009048818 | 4/2009 |
| WO | 2011059595 | 5/2011 |
| WO | 2013163580 | 10/2013 |

OTHER PUBLICATIONS

The Chinese Office Action mailed Jun. 6, 2013 for Chinese patent application No. 200910211788.X, a counterpart foreign application of U.S. Appl. No. 12/992,399, 13 pages.

The Chinese Office Action mailed May 16, 2012 for Chinese patent application No. 200910211788.X, a counterpart foreign application of U.S. Appl. No. 12/992,399, 10 pages.

Final Office Action for U.S. Appl. No. 12/992,399, mailed on Apr. 1, 2013, Li Zhang et al., "Search Method and System," 8 pages.

Non-Final Office Action for U.S. Appl. No. 12/992,399, mailed on Aug. 31, 2012, Li Zhang et al., "Search Method and System," 8 pages.

Takaaki Mizuno, Book That Makes You Understand All About Google, First Ed., Sotechsha Co., Ltd., Japan, Nov. 20, 2007, pp. 59-64.

The Japanese Office Action mailed Mar. 11, 2014 for Japanese application No. 2012-538819, a counterpart foreign application of U.S. Appl. No. 12/992,399, 7 pages.

Office Action for U.S. Appl. No. 14/037,068, dated May 21, 2015, Li Zhang, "Search Method and System", 7 pages.

Office action for U.S. Appl. No. 14/037,068, dated Nov. 19, 2015, Zhang et al., "Search Method and System", 9 pages.

Office Action dated Dec. 22, 2015 in Japanese Application No. 2015-509194.

Search Report & Written Opinion dated Oct. 7, 2013 in PCT Application No. PCT/US2013/038463.

* cited by examiner

ND SYSTEM

CROSS REFERENCE TO OTHER APPLICATIONS

This application claims priority to People's Republic of China Patent Application No. 201210126946.3 entitled AN INFORMATION PROVIDING METHOD, PROCESSING SERVER, AND MERGING SERVER, filed Apr. 26, 2012 which is incorporated herein by reference for all purposes.

FIELD OF THE INVENTION

The present application relates to an information providing method and system.

BACKGROUND OF THE INVENTION

With the growth of the Internet, networks are used to communicate increasing amounts of information. In order to locate desired information from the Internet, many websites provide users with information search services. When searching for information on a website, users provide search conditions corresponding to the user's search intentions. The website finds the information corresponding to the search conditions and provides the found information to the users so that the users can easily find the information that the users need.

Information search systems typically include a plurality of merging servers and a plurality of processing servers. Referring to FIG. 1, an information search system includes a plurality of processing servers 12 being deployed in a plurality of rows and columns providing users with large-scale, highly concurrent search services. The plurality of processing servers 12 is organized into an M×N matrix including M rows and N columns. Each column includes M processing servers and each row includes N processing servers. The information in the information search system is divided in advance into N groups. The processing servers in each column can store one of the groups of information, and each processing server in one column can store the same information.

When a user conducts an information search, the client device that the user uses can transmit an information search request including the search conditions to a merging server. The merging server selects one processing server from the plurality of processing servers of each column. The merging server selects a total of N processing servers and sends the received information search request to each of the selected processing servers. After receiving the information search request sent by the merging server, the processing servers each search within their stored information for information satisfying the search conditions and sends back the found information to the merging server. After the merging server receives the information sent by the plurality of processing servers, the merging server combines the received information and then sends the combined information back to the client device used by the user. The client device provides the received information to the user.

The user, by using the client device, can review the information found by the processing servers to locate the desirable information. If the user wishes to view the information published by a certain information publisher or wishes to view information belonging to a certain category, the user may repeatedly click, browse or perform other such actions with respect to the various pieces of provided information to determine whether the information is desired, and in doing so that the user would waste processing resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
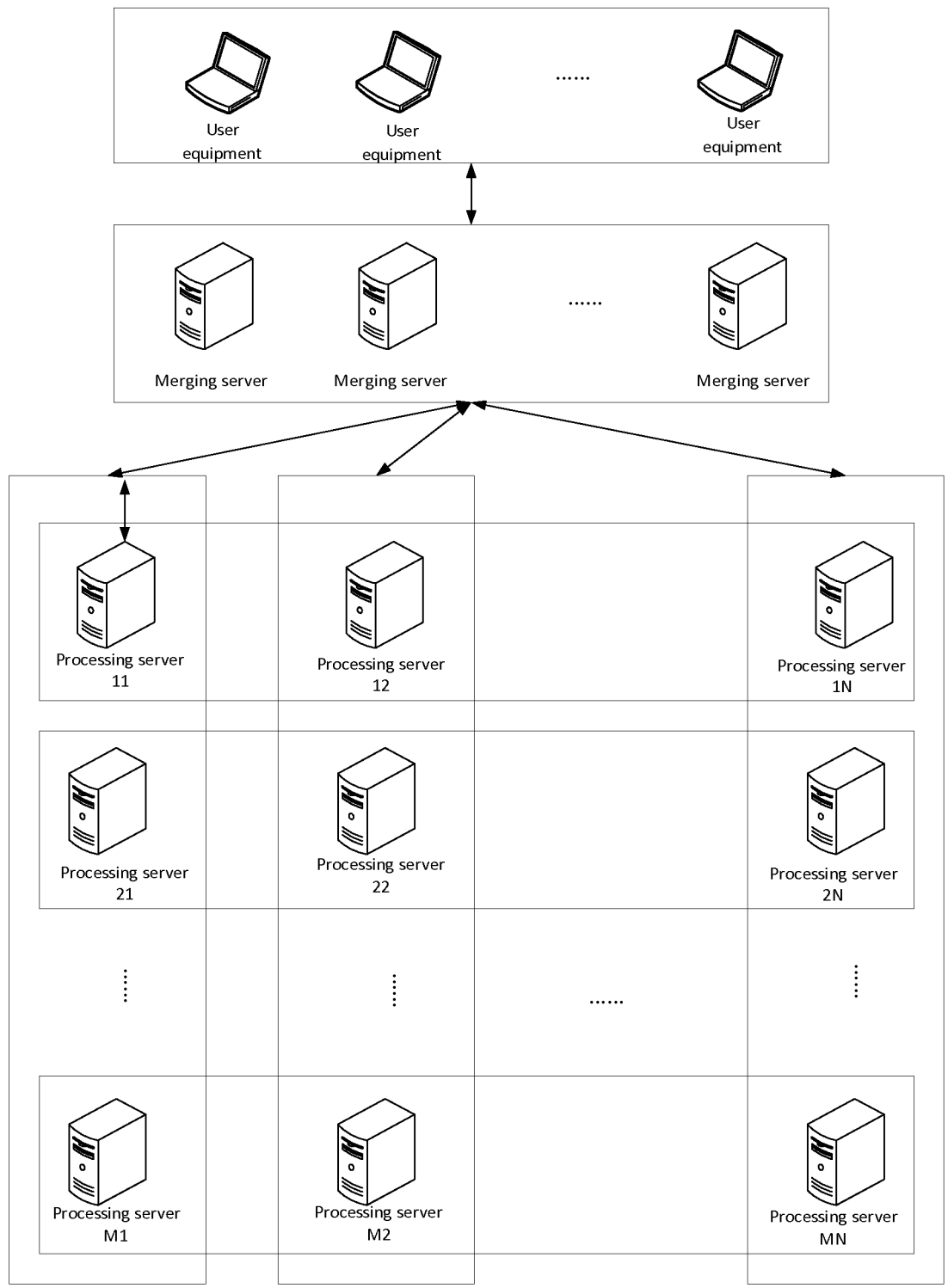
FIG. 1 is a structural diagram illustrating a conventional information search system.
Figure 2:
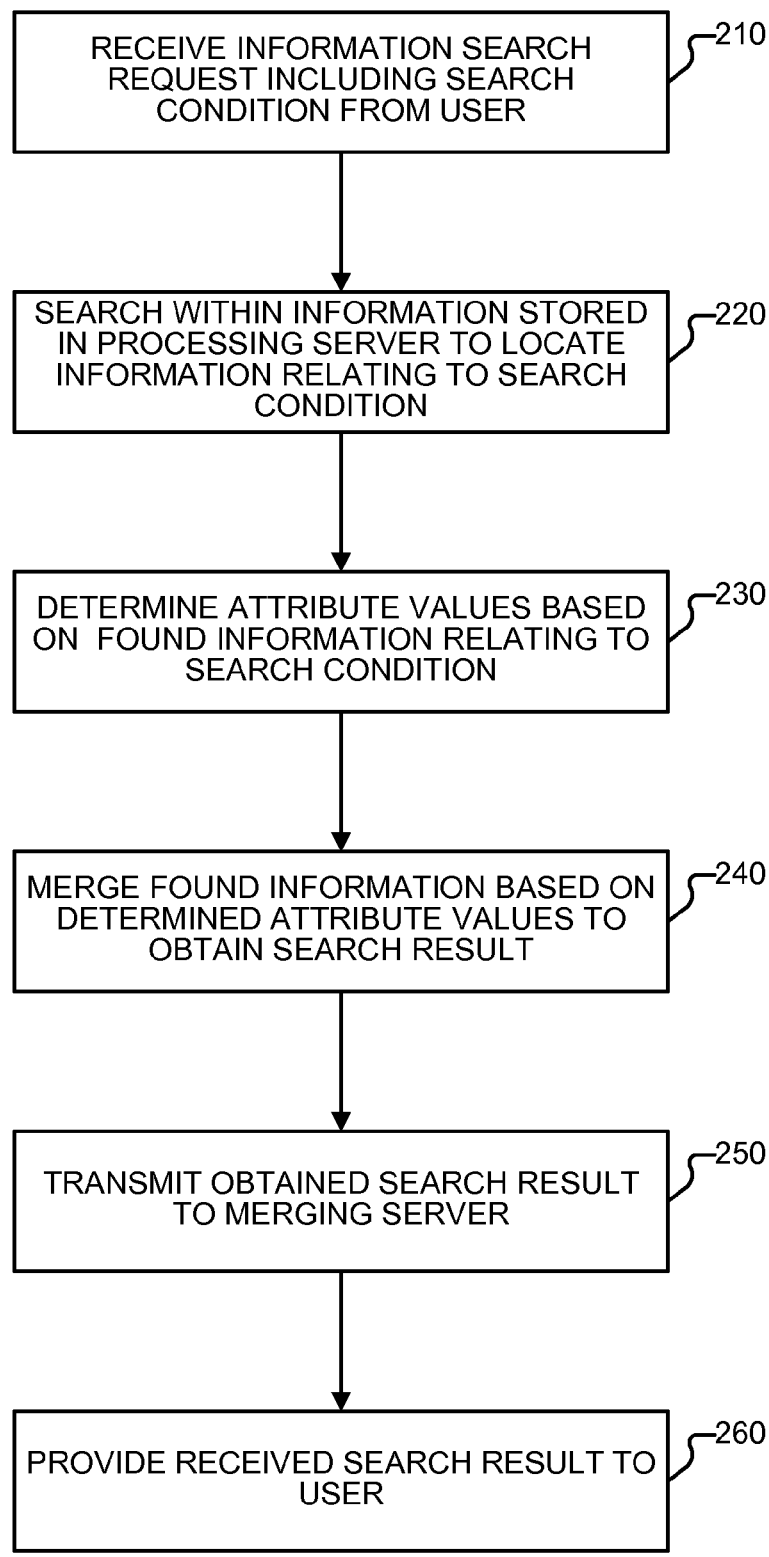
FIG. 2 is a flow chart illustrating an embodiment of an information providing method.

FIG. 2 is a flow chart illustrating an embodiment of an information providing method. The method 200 can be implemented on a system 500 of FIG. 5. The method 200 comprises:

In 210, an information search request including a search condition is received from a user via the user's client device.

In 220, information stored in the processing server is searched to locate information relating to the search condition.

When a user performs an information search, the user first establishes a search condition. When the user confirms the information search (for example, by clicking or activating a "Search" button on a web page), the client device used by the user sends an information search request carrying the search condition to a search page server. The search page server will, depending on current load conditions of various merging servers, select a merging server from the various merging servers by applying load balancing algorithms and identifying the merging server that is currently least busy. The search page server then sends the information search request to the selected merging server based on formatting requirements of the merging server. In some embodiments, the search page server sends the information search request to a load balancer. In some embodiments, the load balancer selects a merging server based on the current load conditions of the various merging servers and then transmits the information search request to the merging server selected by the load balancing server.

In some embodiments, the merging server receives an HTTP request. For example, the following information search request (keyword: mobile phone; category: 1512; and price range: 1000-3000) is sent to the merging server at IP address of 10.11.17.9 using the following URL format: http://10.11.17.9/bin/search?q=mobilephone&category=1512&price=[1000, 3000]. In some embodiments, the merging server receives the information request in other formats.

After the merging server receives the information search request, a processing server is selected from a plurality of processing servers of each column. In the event that the information search system includes M×N processing servers, the merging server selects a total of N processing servers. In order to achieve load balancing in this situation, the probability that the merging server will select any one processing server is substantially the same for each column of processing servers. The merging server transmits the received information search request to each selected processing server. After receiving the information search request sent by the merging server, the processing servers search among the information that they have stored for the information satisfying the search condition of the information search request. In other words, after receiving the information search request sent by the merging server, each processing server searches among their stored information for the information satisfying the search condition of the information search request.

For example, assume that there are 10000 products total and one server can store information relating to 2000 products. Accordingly, 5 servers (N=5) are needed to store all the product information. Each server stores about 20% of the total information. If every second up to 1000 search requests are received, and each server performs up to 500 search requests per second, 2 servers (M=2) storing the same information are needed. Thus, 10 processing servers (M*N=2*5=10) forming a 2×5 processing structure are utilized. To process a search request, all the data must be searched, and each row has a server selected to perform search. The selection can be performed by: 1) selecting the first row or the second row, 2) based on the load of the processing server, selecting the least busy server, or 3) selecting a random server. As an example, a set of possible selection results includes first column first row, second column first row, third column second row, fourth column first row, fifth column first row.

As discussed above, assume that 10000 products are distributed on 5 servers. The products can be distributed as follows: 1) round robin, 2) by taking the modulus of the product ID, or 3) randomly. In a round robin distribution, a first product is on the first server, a second product is on the second server, . . . , a sixth product on the first server etc. By taking the modulus of the product ID, assuming that the product ID of a product is 12345, the modulus of the product ID (12345%5=0) is 0. Accordingly, the product having the product ID 12345 is put on the first server. In another example, assuming that a product has a product id of 12437, the modulus of the product ID (12437%5=2) is 2. Accordingly, the product having the product ID 12347 is put on the third server.

The search condition includes a search keyword, a limiting condition established by the user for an attribute of the information, or any combination thereof. In other words, the search condition may include the search keyword only, the limiting condition only, or the search keyword and the limiting condition described above. In some embodiments, the attribute of the information includes a category attribute, a publication time attribute, or other characteristics of the information. For example, a user conducts an information search on an e-business website. If the user wants to search for "blue sweaters" in a "women's apparel" category, the entered keywords are "blue sweaters," and the limiting condition established for the category attribute of the information is "women's apparel." In another example, the user may establish separate limiting conditions for a plurality of attributes. For example, in addition to establishing a limiting condition with respect to the category attribute of the information, the user also establishes a limiting condition with respect to the publication time attribute by specifying a time range.

In some embodiments, the information search system pre-allocates information to different processing servers. In the examples discussed below, the processing servers in any one column store the same information, and the processing servers in different columns store different information. The technique described herein also applies in embodiments where the processing servers in a row store the same information and the processing servers in different rows store different information. After the information is allocated to the various processing servers, each processing server establishes the following: an inverted list of search keyword units, an inverted list of limiting conditions, a normal list of information, etc. In other words, the processing servers stores the following content: an inverted list of each search keyword unit, an inverted list of each limiting condition, a normal list of information etc.

In some embodiments, the inverted list of search keyword units includes correspondences between each search keyword unit and an information identifier of the information stored in the processing server. The inverted list of limiting conditions includes correspondences between each limiting condition and an information identifier of the information stored in the processing server. The normal list of information includes correspondences between information content and an information identifier of the information stored in the processing server. The information content includes an attribute value of the information as the attribute value relates to each attribute.

In some embodiments, in the event that a processing server is searching for information that satisfies a search condition and the search condition includes only search keywords, the processing server divides the search keyword into various search keyword units and then looks up, in an inverted list of search keyword units, the information identifier corresponding to each search keyword unit. Then the processing server uses the information identifier corresponding to the information content in the normal list of information to obtain the information that satisfies the search condition. In the event that the search condition includes only a limiting condition, the processing server looks up, in the inverted list of limiting conditions, the information identifier corresponding to each limiting condition. Then, the processing server uses each looked up information identifier as a basis for looking up the each corresponding information content in the normal list of information to obtain the information that satisfies the search condition. In the event that the search condition include both a search keyword and a limiting condition, the processing server divides the search keyword into search keyword units and looks up, in the inverted list of keyword units, an information identifier corresponding to each divided keyword unit. Subsequently, the processing server uses each information identifier to look up corresponding information content in the normal list of information. In addition, the processing server also looks up, in the inverted list of limiting conditions, an information identifier corresponding to each limiting condition. The processing server then uses each looked up information identifier as a basis for looking up the corresponding information content in the normal list of information. The processing server performs an intersection of the information obtained based on the searched keyword and the information obtained based on the limiting condition. In some embodiments, the information obtained from the intersection is the information that satisfies the search condition.

In addition, after looking up information based on the search keyword units, the processing server also performs a positional relationship assessment. For example, the processing server determines whether the position of the search keyword unit within the looked up information is the same as the position of the search keyword unit within the search keyword. In the event that the positions of the search keyword unit within the looked up information and the search keyword unit within the search keyword are the same, the found information is regarded as the final found information. In the event that the positions of the search keyword unit within the looked up information and the search keyword unit within the search keyword are not the same, the found information is not regarded as the final found information.

For example, product 1 title include new model smart phone, and student special, and product 2 title includes seniors special phone, and not smart.

After processing is performed, the data stored on the processing server is:
new model: (product 1, position 1)
smart: (product 1, position 2); (product 2, position 5)
seniors: (product 2, position 1)
students: (product 1, position 4)
special: (product 1, position 5); (product 2, position 2)
phone: (product 1, position 3); (product 2, position 3)
not: (product 2, position 4)

The first search term is "smart phone" where there are 2 keywords "smart" and "phone." The search results from "smart" are (product 1, position 2) and (product 2, position 5), and the searchresults from "phone" are (product 1, position 3) and (product 2, position 3) because the search keywords "smart" and "phone" are tightly coupled.

The positions matching the search request of the product 1 "smart" and "phone" are 2 and 3. The positions of the product 2 "smart" and "phone" are 5 and 3, which do not match the search request. When the user wants to precisely match the search request, i.e., during phase match, the position relationships need to be specially processed.

In 230, attribute values related to a merge attribute based on the found information relating to the search condition are determined.

For example, assume that the system combines all products of a seller. The Products are:
Product 1, seller A
Product 2, seller A
Product 3, seller B
Product 4, seller C
Product 5, seller C
Product 6, seller D
Product 7, seller E The search results are: products 1, 2, 4, 7, the combined attribute is: seller, and the combined attribute is product 1, 2, 4, 7's seller attribute, i.e., sellers A, C, E.

In various embodiments, the processing server determines a merge attribute based on a first mode, a second mode, or a combination of the first mode and the second mode.

In the first mode, the processing server pre-establishes designated attributes from among attributes of information. Moreover, the processing server stores attribute identifiers of the pre-established designated attributes in the processing server. The processing server assigns the designated attributes corresponding to the stored attribute identifiers as merge attributes.

In the example above, assume that the system combines the search results of the sellers by default. In other words, the users do not need to specify which attributes to combine because the system performs the combining by default.

When the combined attribute is "sellers," if, in the stored data, the seller data is stored as "seller," "seller" is the attribute identifier. If, in the stored data, the seller data is stored as "company," "company" is the attribute identifier.

In the second mode, in the event that the user conducts an information search, an information search web page provides the user with attribute identifiers of attributes of information. The user selects an attribute from among the attributes of information to serve as a merge attribute. In this case, the user's information search request, in addition to including a search condition, also includes a user-selected attribute identifier for an attribute. The processing server assigns the attribute corresponding to the attribute identifier included in the received information search request to be the merge attribute.

In some embodiments, the processing server combines the first mode and the second mode described above to determine the merge attribute. For example, after receiving the user's information search request, the processing server first determines whether the information search request includes an attribute identifier. In the event that the processing server determines that the information search request includes the attribute identifier, the processing server assigns the attribute corresponding to the attribute identifier to be the merge attribute. In the event that the processing server determines that the information search request does not include the attribute identifier, the processing server assigns the designated attribute corresponding to a pre-stored attribute identifier to be the merge attribute.

In some embodiments, examples of the merge attribute include an information publisher attribute, an information website attribute, etc. In e-commerce websites, examples of the merge attribute include a product provider attribute (also be referred to as a product shop attribute), a product category attribute, a product brand attribute, etc.

In 240, the found information is merged based on the determined attribute values related to the merge attribute of the found information to obtain a search result.

In some embodiments, when the processing server merges the found information, all the found information is merged. In this case, the processing server determines the attribute values related to the merge attribute of the found information. From the found information, the processing server will take the information whose attribute values related to the merge attribute are the same and merges the information into a search result. For example, on an embodiment of an e-commerce website, the processing server finds product information including A1, A2, B1, B2, C1 and C2. A merge attribute in this case is the product shop attribute, and an attribute value of the merge attribute is a shop identifier of a shop to which the product belongs. The processing server determines that the shop identifier corresponding to the product information A1 and A2 is A, the shop identifier corresponding to the product information B1 and B2 is B, and the shop identifier corresponding to the product information C1 and C2 is C. Therefore, the processing server will merge product information A1 and A2 into a first search result, merge the product information B1 and B2 into a second search result, and merge the product information C1 and C2 into a third search result.

For example, assume that the system combines all products of the seller. The products are:
Product 1, seller A
Product 2, seller A
Product 3, seller B
Product 4, seller C
Product 5, seller C
Product 6, seller D
Product 7, seller E Search results are products 1, 2, 4, and 7 for a total of 4 items, the combined attribute is seller, and the combined attribute is seller 1, 2, 4, and 7's seller property, i.e., sellers A, C, E. Since products 1 and 2 have a seller attribute of A, then 1 and 2 are combined, and 3 items are displayed.

In 250, the obtained search result is transmitted to the merging server.

In some embodiments, the search result which the processing server will transmit to the merging server contains relatively large amounts of information. All of the information might not be able to be displayed on the same web page. Therefore, before the processing server transmits the search results to the merging server, the processing server will determine a first piece of information up to a third specified quantity of information included in each search result to be transmitted to the merging server. In some embodiments, the information is ranked based on a preset ranking rule. The processing server retains from the information included in the search result only the determined third specified quantity of information. In other words, the processing server deletes information other than the determined information. The processing server sends the processed search results to the merging server.

For example, assume that each search results page displays 10 products. When the user gets to page 3, products 21-30 should be displayed. To ensure that the merging server obtains 10 products corresponding to the products 21-30 in the overall listing, the processing servers returns products 1-30 and the merging server obtains all of the results of the processing servers. The obtained results correspond to products 1-30. Subsequently, the merging server selects products 21-30 to be displayed to the user.

The third specified quantity of information is preset, for example, to 1. In this case, the search result includes only the first piece of ranked information. In the event that the third specified quantity of information is set to 2, the search result only includes the first two pieces of ranked information.

In 260, the received search result is provided to the user.

In some embodiments, after the merging server receives the search result transmitted by the processing server, the merging server provides the received search result directly to the user. In addition, the search result received by the merging server contains information with a merge attribute having the same attribute values. For example, the merge attribute can be the information publisher attribute, and the processing servers in a first column have stored information having a publisher identifier corresponding to "a," and the processing servers in a second column also have stored information having a publisher identifier corresponding to "a." In this case, the processing server in the first column and the processing server in the second column both send search results containing information whose publisher attribute includes the attribute value corresponding to "a" to the merging server. After receiving the search results, the merging server merges the received search results based on the attribute values relating to the merge attribute of the information contained in the received search result. The merging server provides the merged search result to the user.

In some embodiments, the merging server merges the received search results. At this time, the merging server will individually determine the attribute values relating to the merge attribute of the information contained in each of the received search result and merge the search results (from among all the received search results) that contain information whose attribute values relating to the merge attribute are the same into a search result.

In the event that the merging server provides the search result to the user, the merging server transmits the search result via a search web page server to the client device used by the user. The client device uses a browser to display the received search result on a web page.

Figure 3:
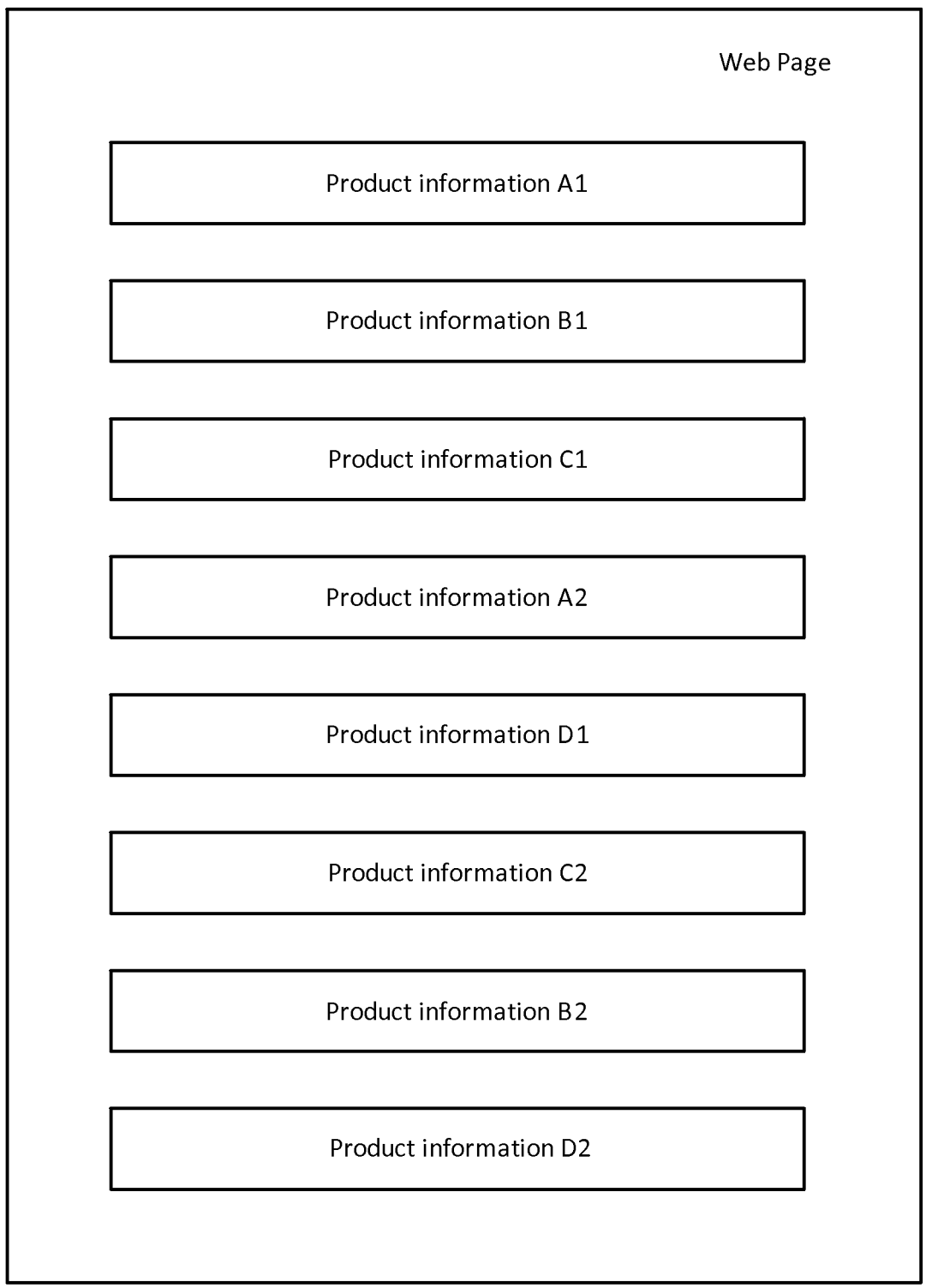
FIG. 3 is a diagram illustrating a conventional web page.

Conventionally, when a user searches for product information on an e-commerce website, the processing server sends the found product information to a merging server. The product information received by the merging server is A1, B1, C1, A2, D1, C2, B2, and D2. Product information A1 and A2 are both product information for shop A, product information B1 and B2 are both product information for shop B, product information C1 and C2 are both product information for shop C, and product information D1 and D2 are both product information for shop D. The merging server transmits the product information to the client device used by the user. The client device includes a browser to display the received product information on a web page. A display format for the product information is as shown in FIG. 3 illustrating a conventional web page. In the event that the user wants to view products from the same shop, the user performs click and browse operations on each piece of the product information. Consequently, the user wastes processing resources and has a poor experience.

Figure 4:
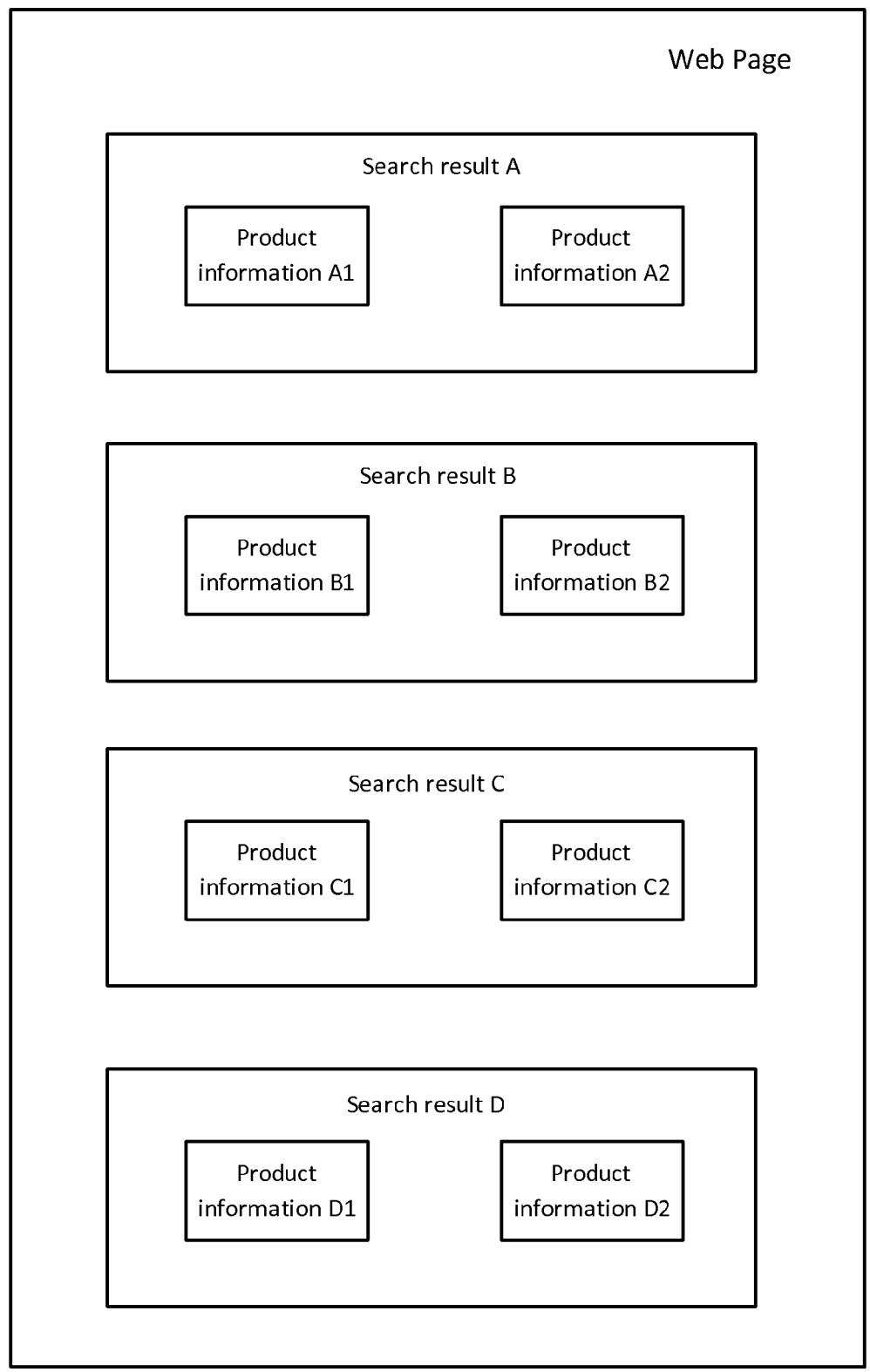
FIG. 4 is a diagram illustrating an embodiment of a web page.

In some embodiments, the processing server will merge the found product information based on a shop attribute. In some embodiments, the shop attributes include shop name, shop reputation, shop sales figures, shop location, shop owner ID, etc. After obtaining the search results, the processing server sends the merged search results to the merging server. The merging server merge the search results according to the shop attribute. The search results includes search result A including production information A1 and production information A2, search result B including production information B1 and production information B2, search result C including production information C1 and production information C2, and search result D including production information D1 and production information D2. The merging server transmits the search results via a search web page server to the client device of the user. The user of the client device uses a browser or other application to display the received search results. An example of a display format of the search results on a web page is shown on FIG. 4. FIG. 4 is a diagram illustrating an embodiment of a web page. In the event that the user wants to view all the products of the same shop, the user directly views search results relating to the shop conserving processing resources and enhancing the user's experience.

In some embodiments, the various search results, which the merging server transmits to the user, contain a relatively large amount of information. The information may not be able to be displayed on the same web page at the same time. Therefore, before the merging server sends the search results to the user, the merging server determine a first piece of information up to a third specified quantity of information contained in each search result to be transmitted to the user. The information is ranked based on a preset ranking rule. The merging server retains from the information contained in the search result up to the determined third specified quantity of information. In other words, the merging server will delete information other than the determined information.

In order to display the information in search results relating to the merge attribute, before sending the search results to the merging server, the processing server will collect information from each search result relating to the merge attribute and transmit the collected information of the each search result to the merging server. For example, in the event that the merge attribute corresponds to a shop attribute for a product information, the processing server will collect shop-related information for each search result. For example, the shop-related information includes quantity of product information relating to the shop, sales status of found product information relating to the shop, price ranges for the product information relating to the shop, etc. The processing server includes the collected shop-related information in the search result to be transmitted to the merging server.

Before providing the search result to the user, the merging server will gather the information relating to the merge attribute to be included in the search result, and transmit the collected information to the user. For example, the merging server will merge a first search result and a second search result into one search result. The merging server will gather the shop-related information in the first and second search results. For example, the shop-related information will include a quantity of product information relating to the shop, a sales status of the product information relating to the shop, a price range of the product information relating to the shop, etc. The merging server will provide the search result including the gathered shop-related information to the user.

Figure 5:
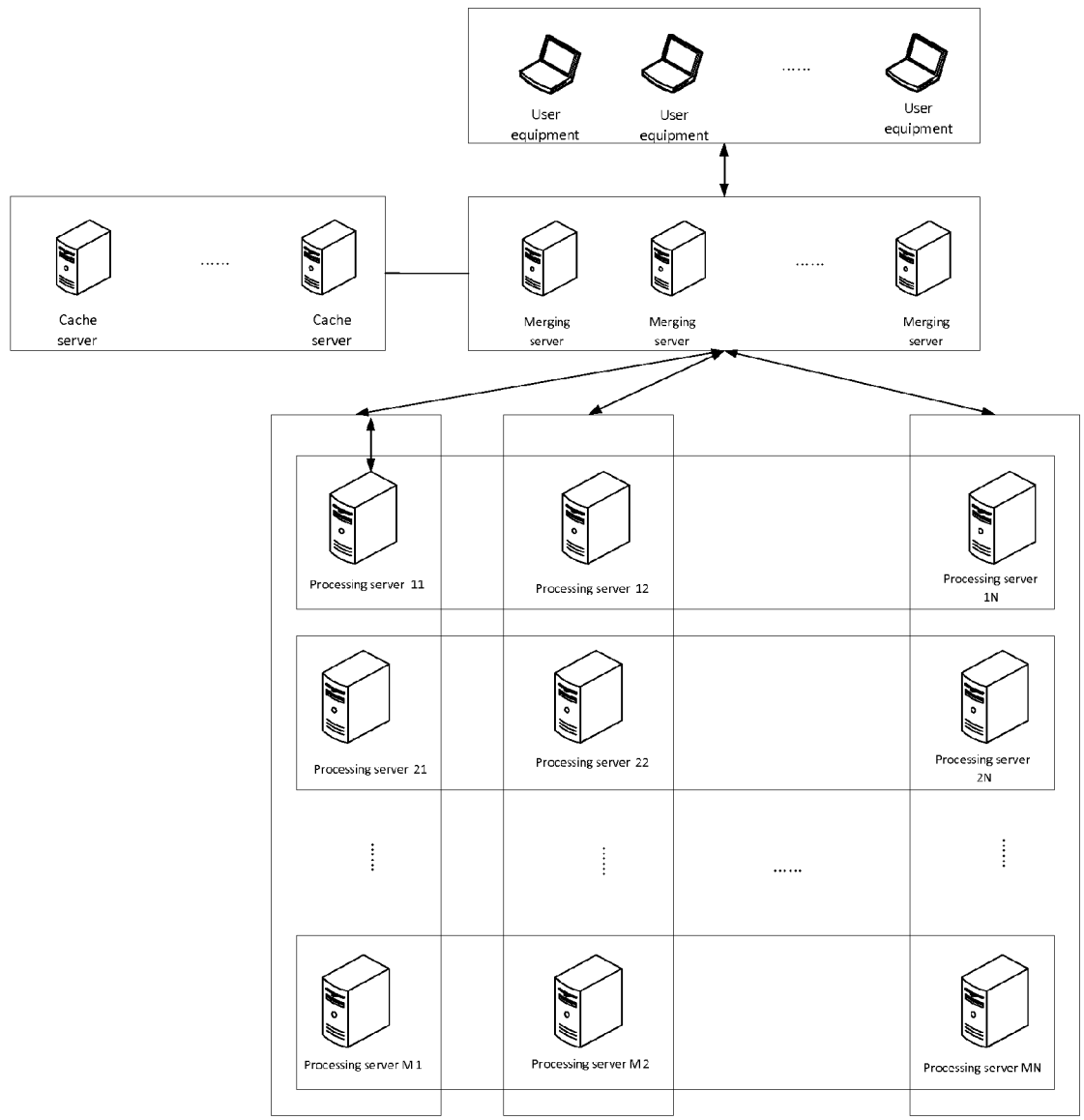
FIG. 5 is a structural diagram illustrating an embodiment of an information search system.

FIG. 5 is a structural diagram illustrating an embodiment of an information search system. The information search system 500, in addition to including the merging servers and the processing servers, also include a cache server. After the merging server receives the search result to be sent to the user, the merging server stores the search condition with the corresponding search result in the cache server. After receiving an information search request from another user, the merging server checks the cache server to determine whether the merging server has a stored search result corresponding to a search condition included in the information search request that has just been received. In the event that the search result corresponding to the search condition included in the information search request that has just been received, the merging server provides the search result that were stored directly corresponding to the search condition to the user without the processing server having to conduct a search. As a result, processing resources are conserved, and information search efficiency is increased. To reduce processing load on the cache server, a store time limit is set for each search condition. In the event that the store time limit is exceeded, the cache server deletes the stored search condition and the corresponding search result.

As described above, after receiving the information search request including the search condition, the processing server searches within the information stored in the processing server for information relating to the search condition. The processing server does not directly send the found information to the merging server. Instead, the processing server uses the attribute values related to the merge attribute of the found information to merge the found information and transmits the obtained search result to the merging server. The merging server provides the received search result to the user. In the event that the user views the received search result, the user does not need to view each piece of the information one at a time. Instead, the user views the search result after the search results have been merged. The search results is merged based on the attribute values related to the merge attribute. In the event that the user wishes to view information related to the merge attribute, the user looks up desired information from the obtained search result avoiding repeated clicking, browsing, and other actions relating to the information. Accordingly, processing resources are conserved, and users look up information more efficiently.

Two information providing modes are disclosed.

In a first information providing mode, web pages are limited with respect to the amount of information items that is displayed. A processing server may find a large amount of information based on the received search condition. After the processing server finds information based on a search condition, the processing server merges a portion of the found information. As an example, the processing server can select a first specified quantity of attribute values from among the attribute values relating to the merge attribute of the found information. For each selected attribute value, the processing server merges the information relating to the selected attribute values relating to the merge attribute into a search result.

In the event that the processing server selects the first specified quantity of the attribute values, the processing server can first rank the found information based on a preset ranking rule and then use the ranked information as a basis for ranking the attribute values related to the merge attribute of the found information. The processing server selects a first specified quantity of the attribute values based on the ranking results of the attribute values. For example, the processing server selects the first attribute values up to a specified quantity.

The information in the search result after merging is ranked in the same way as being ranked prior to merging. For example, the information included in the search result includes A and B. Before being merged, A is ranked in front of B after being ranked according to the preset ranking rule. Thus, in the search results, A is also ranked in front of B after the merging.

In some embodiments, the ranking rule is preset in advance. Rankings are performed based on the attribute values of a designated attribute for the information. For example, the information can be ranked based on information publication times. In e-commerce websites, the information is ranked based on a sales quantity, a sales volume, a product price, etc.

For example, product information found by the processing server is A1, A2, B1, B2, C1, C2, D1 and D2. After ranking according to product sales volume, the results are D1, A2, D2, C2, B1, C1, A1 and B2. The merge attribute is the shop attribute for a product. The processing server uses the ranking results of the product information to rank the attribute values related to the shop attribute. The obtained ranking results are D, A, C and B. In the event that the first specified quantity is 3, the first 3 attribute values selected by the processing servers are D, A and C. The processing server merges the found information whose shop attribute value is D. The search result D includes production information D1 and production information D2. The processing server merges the found information having a shop attribute value of A. The search result A includes production information A2 and production information A1. The processing server merges the found information having a shop attribute value of C. The search result C includes production information C2 and production information C1. Thus, the search results obtained are D (D1, D2), A (A2, A1), and C (C2, C1).

In addition, a web page has a limit with respect to the number of information items that the web page displays. On the other hand, a merging server may receive a very large number information items in a search result. The merging server can also merge a portion of the received search result. As an example, the merging server selects a second specified quantity of attribute values from the attribute values relating to the merge attribute of the information included in the received search result. For each selected attribute value, the merging server merges the search results into one search result. After the merging server obtains the merged search result, the merging server ranks the pieces of the search result based on a preset ranking rule.

In the event that the merging server selects the second specified quantity of attribute values, the merging server, for each received search result, determines a first piece of information after the information included in the search result has been ranked based on the preset ranking rule. The merging server ranks the determined information based on a preset ranking rule. The ranking results of the determined information is used as a basis for ranking the attribute values related to the merge attribute of the determined information. The second specified quantity of attribute values is selected based on the ranking results of the attribute values.

For example, the search results received by the merging server are search result B including production information B1 and production information B3, search result A including production information A2 and production information A1, search result C including production information C4 and production information C2, search result D including production information D1, search result A including production information A15 and production information A10, search result C including production information C17 and production information C20, and search result E including production information E2 and production information E7. Because the product information included in each search result was ranked based on product sales volume, the merging server directly extracts product information B1, A2, C4, D1, A15, C17, and E2 from the search results. The merging server ranks the extracted information based on the product sales volume to obtain A15, B1, A2, C4, C17, E2 and D1. The merge attribute is the product shop attribute. The merging server uses the ranking results to rank the attribute values related to the shop attribute of the information. The ranking results are A, B, C, E and D. In the event that the second specified quantity is 4, the merging server selects the first four attribute values A, B, C and E.

In some embodiments, the first specified quantity and the second specified quantity are determined based on the number of current web pages and the amount of information that is displayed on a web page. In the event that the number of current web pages is n and the amount of information that is displayed on a web page is K, the first specified quantity is set to n×K, and the second specified quantity is set to K. In the event that the merging server selects the second specified quantity of the attribute values, the merging server will subtract the first (n−1)K attribute values and select the first K attribute values. In other words, the merging server will select ranked attribute values from attribute value (n−1)K−1 to attribute value nK. For example, in the event that the number of current web pages is 1 and the amount of information that is displayed on a web page is 40, the first specified quantity is 40. In other words, the processing server selects the first 40 ranked attribute values. The second specified quantity is 40. In other words, the merging server selects the first 40 attribute values. In the event that the number of current web pages is 2, and the amount of information that is displayed on a web page is 40, the first specified quantity is 80. In other words, the processing server will select the first 80 ranked attribute values. The second specified quantity is 40. In other words, the merging server selects the ranked attribute values from attribute value 41 to attribute value 80.

Figure 6:
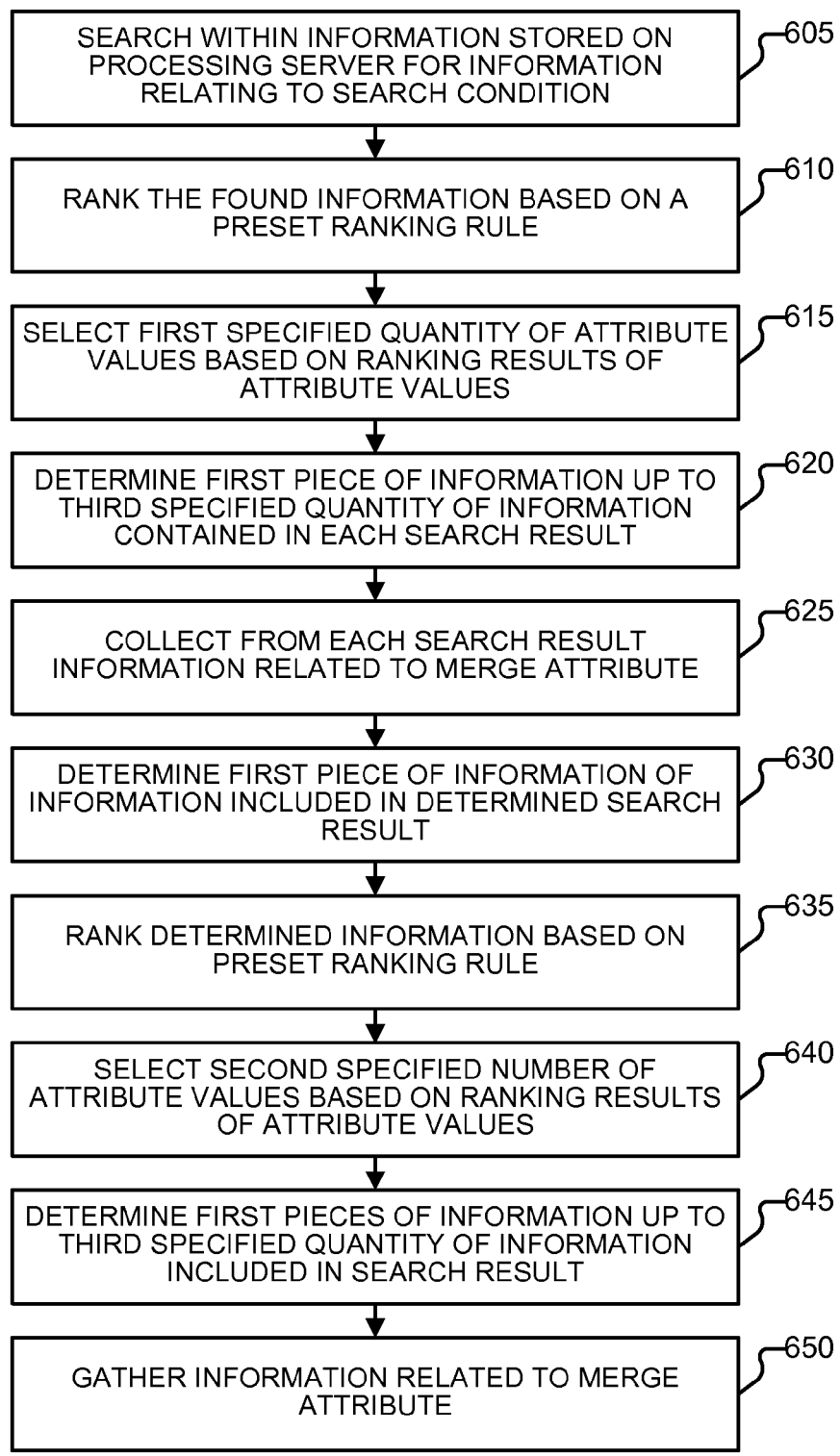
FIG. 6 is a flow chart illustrating an embodiment of an information providing process.

FIG. 6 is a flow chart illustrating an embodiment of an information providing process. The information providing process 600 can be implemented by the information search system 500 of FIG. 5. The information providing process 600 includes:

In 605, after receiving an information search request including a search condition sent by the merging server, a search is performed within the information stored on the processing server for information relating to the search condition.

In 610, the found information is ranked based on a preset ranking rule and attribute values related to a merge attribute of the information are ranked based on the ranking results.

In 615, a first specified quantity of attribute values is selected based on the ranking results of the attribute values, and for each selected attribute value, the information related to the selected attribute values is merged into one search result.

In 620, a first piece of information up to a third specified quantity of information included in each search result is determined and information other than the determined information is deleted. The information having been ranked based on a preset ranking rule.

In 625, from each search result information related to the merge attribute, the relevant information in the each search results to be sent to the merging server is collected and stored.

In 630, for each search result that the merging server receives, a first piece of information of the information included in the determined each search result is determined. The information has been ranked based on the preset ranking rule.

In 635, the determined information is ranked based on the preset ranking rule, and the attribute values related to the merge attribute of the determined information are ranked based on the ranking results of the information.

In 640, a second specified number of attribute values is selected based on the ranking results of the attribute values, and for each selected attribute value, the search results in which the attribute values related to the merge attribute of the contained information is the selected attribute value is merged into one search result.

In 645, for each search result, the first pieces of information up to a third specified quantity of information included in the search result is determined, and information other than the determined information is deleted. The information is ranked based on the preset ranking rule.

In 650, the information related to the merge attribute is gathered and the gathered information is provided to the user.

In the first information providing mode, the information search system includes two columns of processing servers. The first column of processing servers finds 2,000 pieces of information corresponding to 200 shops. The second column of processing servers finds 3,000 pieces of information corresponding to 150 shops. The product information of a shop is distributed across the first and second columns of the processing servers. In the event that the processing servers select only 40 shops, the first column of processing servers might select shop A, and the second column of processing servers might not select shop A. Therefore, the search results provided by the first column of processing servers will contain search results related to shop A, and the search results provided by the second column of processing servers will not contain search results related to shop A. Therefore, the merging server does not obtain all the shop A information, and the search results may not be very accurate.

For example, assume that there are 10000 products and 100 shops for a search query, processing server 1 finds 1000 products merged into 80 shops, and returns the first 40 results to the merging server, and processing server 2 finds 150 products merged into 110 shops, and returns the first 40 results to the merging server. Because the merging server does not obtain all the results from the processing servers 1 and 2, the results may not be accurate.

To address the problem described above, the second information providing mode differs from the first information providing mode in that after the processing server merges the found information, the processing server does not then send the search results directly to the merging server, but instead, for each merged search result, the processing server determines the first piece of information of the information contained in the merged search result, and sends the information determined for the each search results to the merging server. The information has been ranked according to a preset ranking rule. In other words, the processing server sends the first specified quantity of information to the merging server. After the merging server receives the information, the merging server selects a second specified quantity of attribute values from among the attribute values relating to the merge attribute of the received information and sends the selected attribute values to the processing server. The sending of the selected attribute values to the processing server corresponds to notifying the processing server which attribute values relate to the merge attribute should be in the search results which the merging server will need to send. After the processing server receives the attribute values sent by the merging server, the processing server selects, from among the found information, the information. The processing server merges the selected information based on the attribute values relating to the merge attribute of the selected information, and sends the merged selected information to the merging server. The merging server merges the received selected information based on the attribute values related to the merge attribute of the information included in the received search results and then provides the merged received selected information to the user.

For example, assume that there are 10000 products and 100 shops for a search query. Processing server 1 finds 1000 products merged into 80 shops, and returns the first 40 results to the merging server. Processing server 2 finds 150 products merged into 110 shops and returns the first 40 results to the merging server.

The processing servers 1 and 2 do not calculate shop dimensions information, as mentioned in the above example. for example, the number of products that satisfy the search request in the shops. Instead, the merging server ranks the processing servers' returned result to determine the 40 results to return to the user, for example, shops 1, 5, 7, 19, 30, etc.

The merging server sends the attribute values of the 40 shops to the processing servers again. The processing servers process the 40 attribute values, calculate the shop dimensions information, and returns the shop dimensions information to the merging server. Because the processing servers process the same 40 attribute values, the above problem where shop A is returned by processing server 1, but is not returned by processing server 2. Thus, by adding an exchange between the merging server and the processing servers, the data accuracy is increased.

In the second information providing mode, the merging server, when selecting the second specified quantity of attribute values, ranks the received information based on a preset ranking rule and rank the attribute values relating to the merge attribute of the received information based on the ranked received information. The merging server uses the ranked attribute values to select the second specified quantity of attribute values.

In the first information providing mode, the processing server sends the merged search results directly to the merging server. In the second information providing mode, the processing server sends information from the merged search results to the merging server. The merging server sends the attribute values related to the merge attribute of the search results to the processing server. The processing server determines each search result based on the received attribute values and send the each search result to the merging server. Thus, in the event that a plurality of processing servers have information whose attribute values relating to the merge attribute are the same, the merging server learns of the attribute values from the information sent by other processing servers, even if some of the processing servers fail to select the attribute values. The merging server instructs each processing server to determine the search results corresponding to the attribute values. Thus, the processing servers sends the search results corresponding to the attribute values to the merging server to increase the accuracy of the search results.

In addition, the second information providing mode offers a collection of information relating to the merge attribute in the search results by the processing servers after the final search result is obtained. In other words, after assigning the merged search result to be the final obtained search result, the processing server, for each final obtained search result, collects the information relating to the merge attribute in the obtained search result, store the collected relevant information in the search results, and send the collected relevant information to the merging server. The information collecting process is the same as the second information providing mode and a discussion will be for conciseness. Before providing the merged search result to the user, the merging server gathers the information relating to the merge attribute and included in the merged search result and then sends the merged search result to the user. The process of gathering information is the same as the process in the second information providing mode and a discussion will be omitted for conciseness.

In the first information providing mode, the information collecting operation of the processing servers is executed after the found information is merged. The search results sent by the processing server includes the collected information. Since the merging server merges only a part of the search results received, the merging server may not merge some of the search results that were sent by the processing servers. Thus, the information collecting operation performed by the processing servers wastes processing resources. In the second information providing mode, the information collecting operation of the processing servers is executed after obtaining the final search results. The merging server merges the search results sent by the processing servers and transmits the merged search results to the user conserving processing resources.

Figure 7:
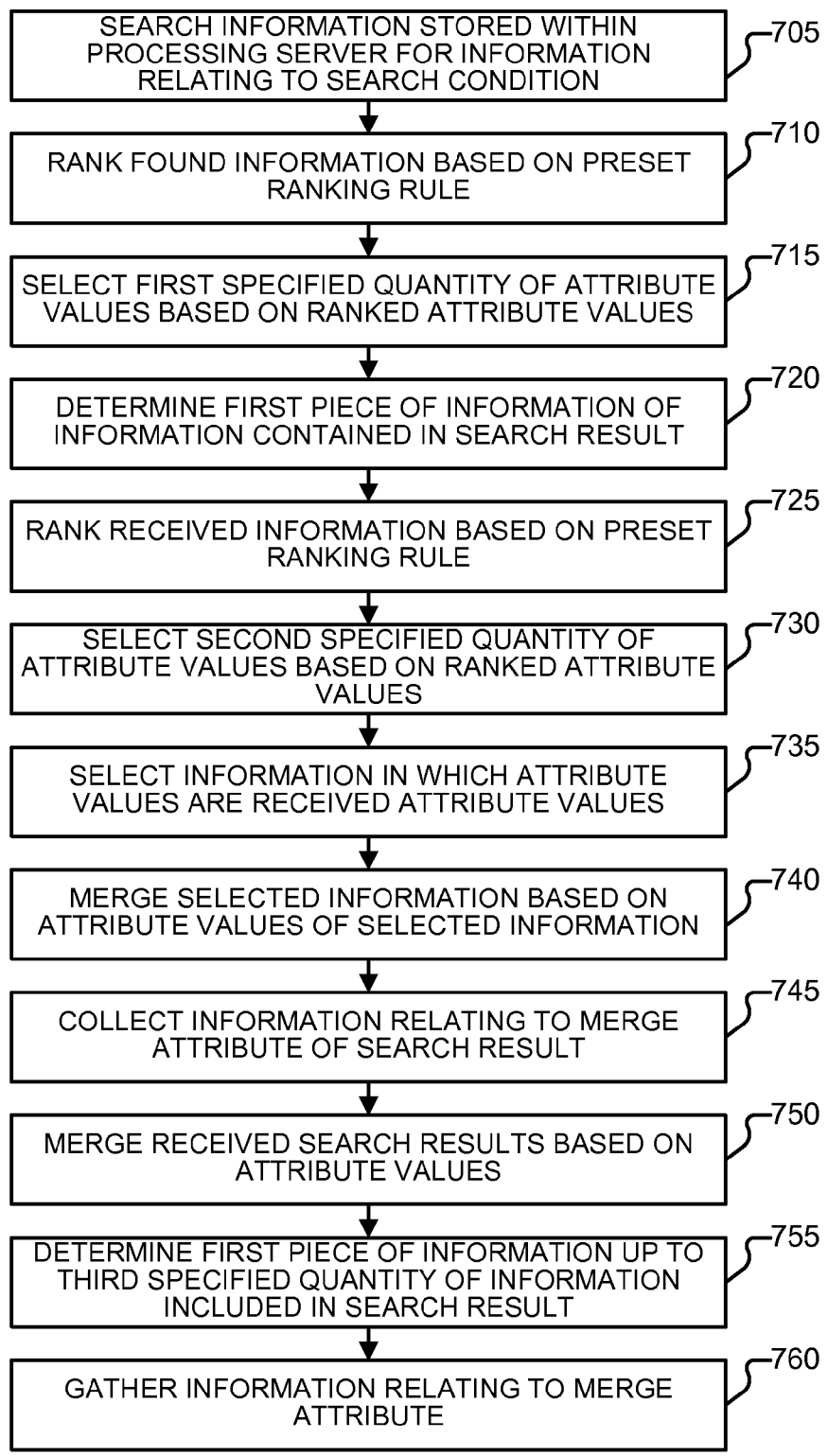
FIG. 7 is a flow chart illustrating another embodiment of an information providing process.

FIG. 7 is a flow chart illustrating another embodiment of an information providing process. The information providing process 700 can be implemented by the information search system 500 of FIG. 5. The information providing process 700 comprises:

In 705, after receiving an information search request including a search condition sent by the merging server, a processing server searches information stored within the processing server for information relating to the search condition.

In 710, the processing server ranks the found information based on a preset ranking rule and rank attribute values related to a merge attribute of the information based on the ranked information.

In 715, the processing server selects a first specified quantity of attribute values based on the ranked attribute values, and for each selected attribute value, merge the information in which the attribute values related to the merge attribute is the selected attribute values into a search result.

In 720, the processing server determines, for each merged search result, the first piece of information of the information contained in the search result and transmit the determined first piece of information to the merging server. In some embodiments, the information is ranked based on the preset ranking rule.

In 725, the merging server ranks the received information based on a preset ranking rule and rank the attribute values related to the merge attribute of the information based on the ranking results of the information.

In 730, the merging server selects a second specified quantity of attribute values based on the ranked attribute values and transmit the selected attribute values to the processing server.

In 735, the processing server selects, from among the found information, the information in which the second specified quantity of attribute values related to the merge attribute are the received attribute values.

In 740, the processing server merges the selected information based on the attribute values related to the merge attribute of the selected information to obtain the merged search result as the finally obtained search result.

In 745, for each search result, the processing server collects information relating to the merge attribute of the search result and store the collected information in the each search result to be sent to the merging server.

In 750, the merging server merges the received search results based on the attribute values related to the merge attribute of the information included in the received search results.

In 755, for each search result, the merging server determines a first piece of information up to a third specified quantity of information included in the search result, and delete information other than the determined information. The information has been ranked based on the preset ranking rule.

In 760, the merging server gathers the information relating to the merge attribute and store the information in the search results, and provide the information to the user.

Two information allocating modes includes a first information allocating mode and a second information allocating mode.

In the first information allocating mode, in the event that information in an information search system is being allocated to various processing servers, the information is allocated to processing servers in the various columns based on information identifiers of the information. In this case, the information for attribute values related to a merge attribute are distributed across a plurality of columns of processing servers. For example, the product information of a shop is distributed across two columns of processing servers.

In the second information allocating mode, in the event that information in an information search system is being allocated to various processing servers, the information is allocated to processing servers in the various columns based on the attribute values related to the merge attribute to ensure that information with the same attribute values is allocated to the same column of processing servers. In other words, the search results obtained by different processing servers will not have search results with the same merge attribute values.

In the event that the second information allocating mode is applied to the first information providing mode, the merging server does not need to merge all of the search results because the attribute values related to the merge attribute for the information contained in each received search result are different.

In the event that the second information allocating mode is applied to the second information providing mode, the merging server does not need to merge all the received information after receiving the information sent by the processing servers because each piece of received information has a different attribute values related to the merge attribute. In addition, after the merging server later receives the final search results sent by the processing server, the merging server does not need to merge the search results because the attribute values related to the merge attribute in each received search result is different, and all the received search results are provided directly to the user.

As shown the above, applying the second information allocating mode to the first or second information providing modes allows the merging server to skip a search result merging operation and an information merging operation to conserve processing resources.

Figure 8:
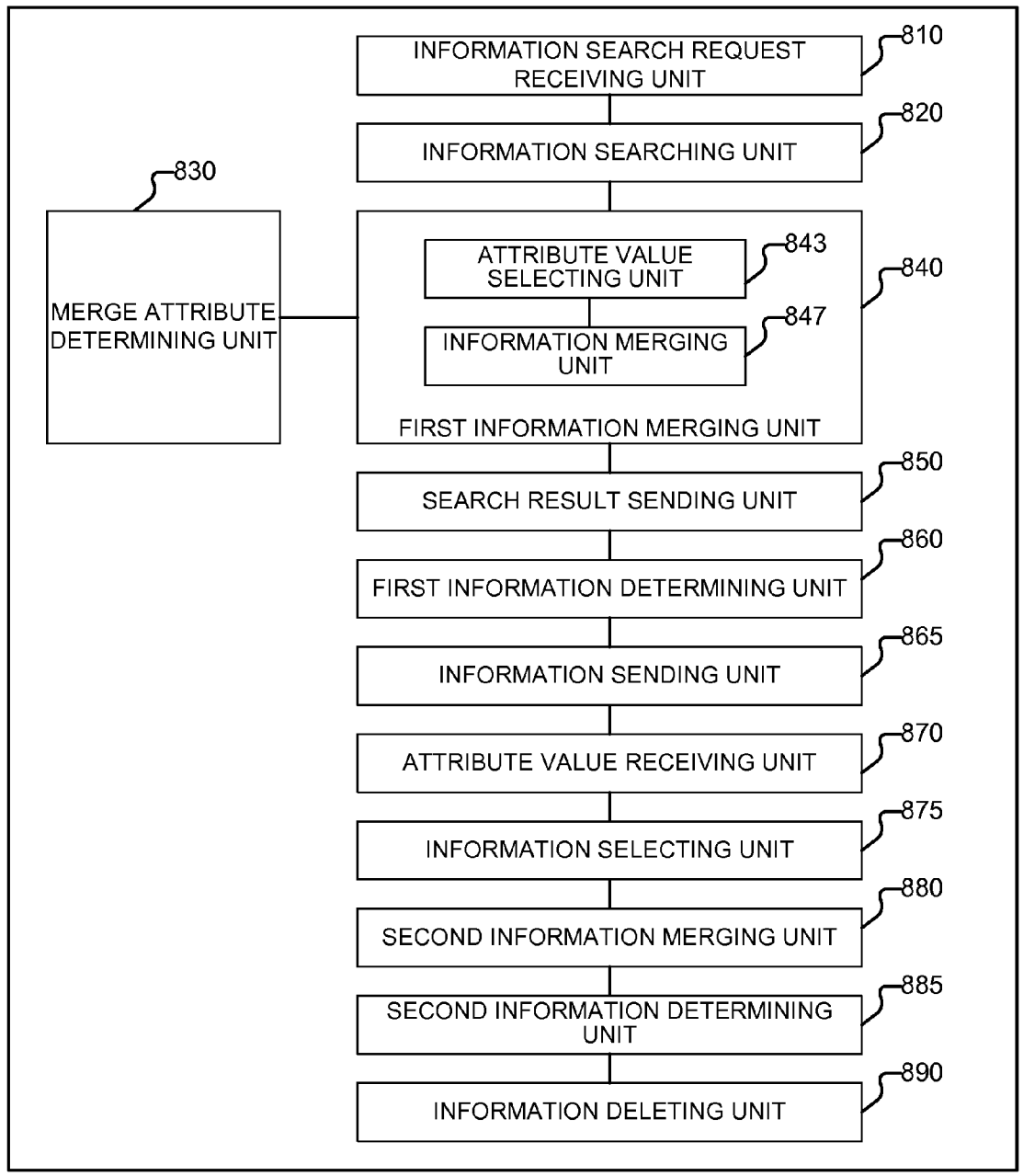
FIG. 8 is a structural diagram illustrating an embodiment of a processing server.

FIG. 8 is a structural diagram illustrating an embodiment of a processing server. The processing server 800 can be used to implement the information providing method 200 of FIG. 2. The processing server 800 includes an information search request receiving unit 810, an information searching unit 820, a merge attribute determining unit 830, a first information merging unit 840, and a search result sending unit 850. The processing server 800 includes a first information determining unit 860, an information sending unit 865, an attribute value receiving unit 870, an information selecting unit 875, a second information merging unit 880, a second information determining unit 885 and an information deleting unit 890.

The information search request receiving unit 810 receives an information search request including a search condition.

The information searching unit 820 searches within information of a processing server having stored information relating to the search condition.

The merge attribute determining unit 830 determines a merge attribute of the information.

The first information merging unit 840 uses attribute values related to the merge attribute determined by the merge attribute determining unit 830 in the information found by the information searching unit 820 as a basis for merging the information found by the information searching unit 820 to obtain search results.

The search result sending unit 850 sends the search results obtained by the first information merging unit 840 to a merging server to provide the received search results to the user.

In some embodiments, the merge attribute determining unit 830 confirms pre-established, designated attributes of the information as merge attributes, or to confirm attributes corresponding to attribute identifiers included in the information search request received by the information search request receiving unit 810 as merge attributes. The attribute identifiers are selected by users from among various attributes of the information.

The first information merging unit 840 includes an attribute value selecting unit 843 and an information merging unit 847.

The attribute value selecting unit 843 selects a first specified quantity of attribute values of the attribute values related to the merge attribute of the information of the information searching unit 820.

The information merging unit 847 merges, with respect to each attribute value selected by the attribute value selecting unit 843, the information related to the selected first specified quantity of attribute values into one search result.

In some embodiments, the attribute value selecting unit 843 ranks the information found by the information searching unit 820 based on a preset ranking rule, rank the attribute values related to the merge attribute of the information based on the ranked information, and select a first specified quantity of attribute values based on the ranked attribute values.

The first information determining unit 860, before the search result sending unit 850 sends the search results obtained by the first information merging unit 840 to the merging server, determines, with respect to each search result merged by the first information merging unit 840, a first piece of information of the information contained in the obtained search result, the information having been ranked according to a preset ranking rule;

The information sending unit 865 sends the information determined by the first information determining unit 860 to the merging server.

The attribute value receiving unit 870 receives the determined attribute values sent by the merging server.

The information selecting unit 875 selects from the information found by the information searching unit 820 the information of the attribute values received by the attribute value receiving unit 870.

The second information merging unit 880 uses the attribute values related to the merge attribute of the information selected by the information selecting unit 875 for merging the information selected by the information selecting unit 875 and associate the merged search results as the finally obtained search results.

The second information determining unit 885, before the search result sending unit 850 sends the search results obtained by the first information merging unit 840 to the merging server, determines, for each obtained search result, a first piece of information up to a third specified quantity of the information included in the obtained search result, the information having been ranked based on the preset ranking rule.

The information deleting unit 890 deletes information other than the information determined by the second information determining unit 885 from the information included in the search result.

Figure 9:
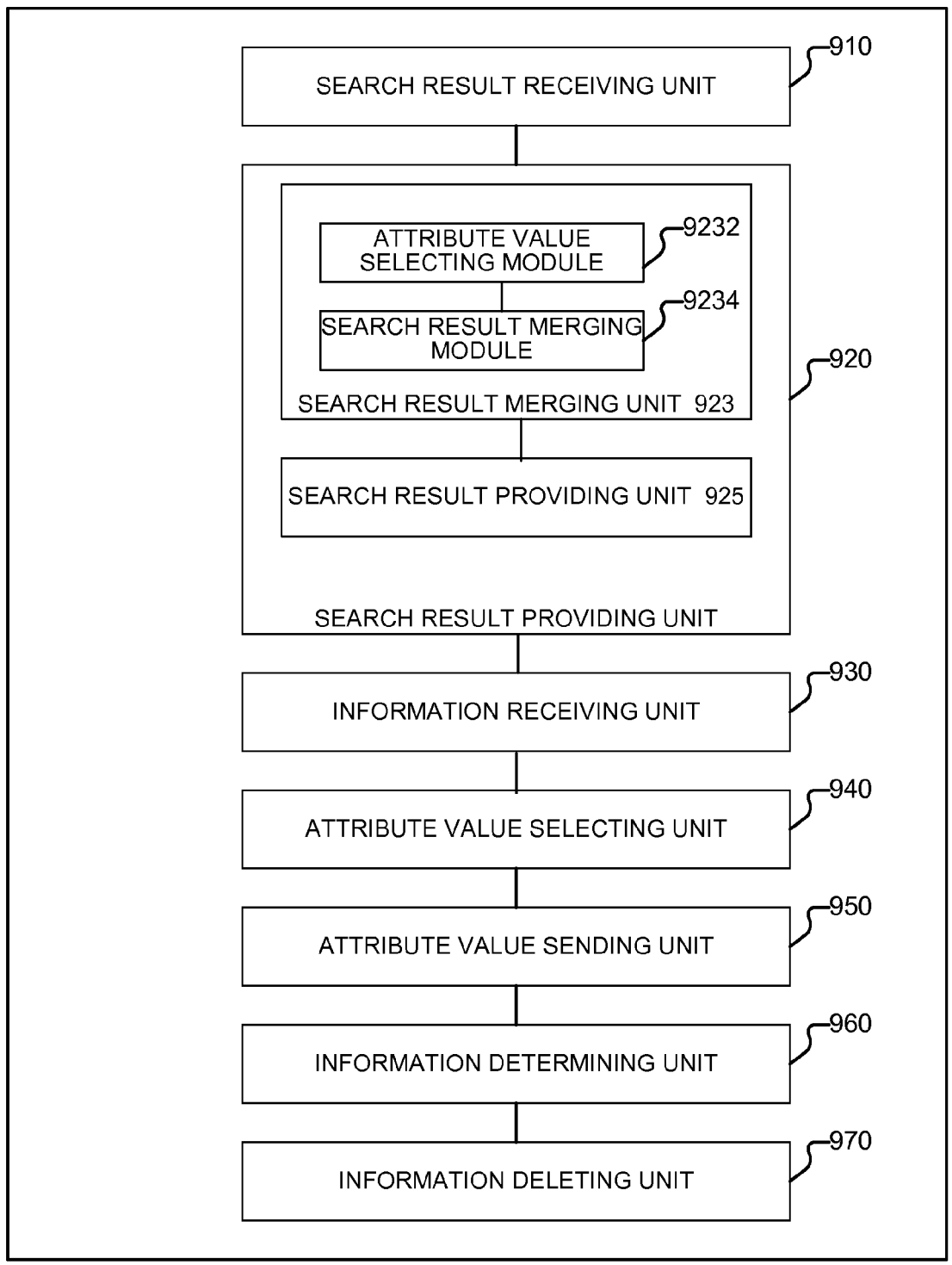
FIG. 9 is a structural diagram illustrating an embodiment of a merging server.

FIG. 9 is a structural diagram illustrating an embodiment of a merging server. The merging server 900 includes a search result receiving unit 910 and a search result providing unit 920. The merging server 900 includes an information receiving unit 930, an attribute value selecting unit 940, an attribute value sending unit 950, an information determining unit 960, and an information deleting unit 970.

The search result receiving unit 910 receives a search result sent by the processing server.

The search result providing unit 920 provides the search result received by the search result receiving unit 910 to the user.

In some embodiments, the search result providing unit 920 includes a search result merging unit 923 and a search result providing unit 925.

The search result merging unit 923 uses the attribute values related to the merge attribute of the information included in the search result received by the search result receiving unit 910 for merging the search result received by the search result receiving unit 910.

The search result providing unit 925 provides the search result merged by the search result merging unit 923 to the user.

In some embodiments, the search result merging unit 923 includes an attribute value selecting module 9232 and a search result merging module 9234.

The attribute value selecting module 9232 selects a second specified quantity of attribute values from the attribute values related to the merge attribute of the information included in the search result.

The search result merging module 9234, for each attribute value selected by the attribute value selecting module 9232, merges the search result of the selected attribute values into a search result.

In some embodiments, the attribute value selecting module 9232 determines, for each search result received by the search result receiving unit 910, a first piece of information of the information contained in the received search result, the information having been ranked according to a preset ranking rule, rank the determined information and use the ranking results for the determined information for ranking the attribute values related to the merge attribute of the determined information, and select a second specified quantity of attribute values based on the ranked attribute values.

The information receiving unit 930, before the search results receiving unit 910 receives the search result sent by the processing server, receives information sent by the processing server.

The attribute value selecting unit 940 selects a second specified number of attribute values from the attribute values related to the merge attribute of the information received by the information receiving unit 930.

The attribute value sending unit 950 sends the attribute values selected by the attribute value selecting unit 940 to the processing server.

In some embodiments, the attribute value selecting unit 940 ranks the information received by the information receiving unit 930 based on a preset ranking rule, use the ranking results for the information received by the information receiving unit 930 for ranking the attribute values related to the merge attribute of the information received by the information receiving unit 930, and select a second specified quantity of attribute values based on the ranked attribute values.

In some embodiments, the search result providing unit 920 uses attribute values related to the merge attribute of the information included in the search results received by the search result receiving unit 910 to merge the search results received by the search result receiving unit 910 and provide the merged search result to the user.

The information determining unit 960, before the information providing unit 920 provide the search results received by search result receiving unit 910 to the user, for each obtained search result, determines a first piece of information up to a third specified quanity of the information contained in the obtained search result, the information having been ranked according to a preset ranking rule.

The information deleting unit 970 deletes information other than the information determined by the information determining unit 960 from the information included in the search result.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An information providing method, comprising:
receiving an information search request including a search condition sent by a client, wherein the search condition includes search keywords;
forwarding the information search request to a plurality of processing servers to search for information relating to the search condition, comprising:
selecting a processing server of the plurality of processing servers based on an identifier of information relating to the search condition and a number relating to the plurality of processing servers; and
forwarding the information search request to the selected processing server for the selected processing server to:
divide the search keywords into a plurality of search keyword units;
look up, in a list of search keyword units, an information identifier corresponding to each search keyword unit, the information identifier corresponding to information content; and
determine whether a position of a search keyword unit within the information content matches a position of the search keyword unit of a search keyword;
wherein:
in the event that the position of a search keyword unit within the information content matches the position of the search keyword unit of the search keyword, the information content is regarded as final found information content; and
in the event that the position of a search keyword unit within the information content does not match the position of the search keyword unit of the search keyword, the information content is not regarded as the final found information content;
determining, using a processor, a merge attribute based on the information relating to the search condition, the merge attribute having related attribute values, the related attribute values including first and second attribute values, the first attribute value being different from the second attribute value, wherein the determining of the merge attribute comprises pre-establishing a designated attribute from an attribute of the information relating to the search condition to be the merge attribute;
merging the information relating to the search condition based on the determined merge attribute of the information relating to the search condition to obtain search results, comprising:
determining first found information from the information relating to the search condition based on the first attribute value;
determining second found information from the information relating to the search condition based on the second attribute value, the first found information being different from the second found information; and merging the first found information and the second found information into a search result; and providing the obtained search results to the client to be displayed.

2. The method as described in claim 1, wherein the determining of the merge attribute comprises:

selecting an attribute identifier by the client from an attribute of the information included in the search condition of the information search request; and determining the attribute corresponding to the selected attribute identifier to be the merge attribute.

3. The method as described in claim 1, further comprising:

selecting of a first specified number of attribute values from the related attribute values, comprising:

ranking the information relating to the search condition based on a preset ranking rule;

ranking the related attribute based on the ranked found information; and selecting the first specified number of attribute values from the ranked attribute values.

4. The method as described in claim 1, wherein the providing of the obtained search results to the client comprises:

merging the received search results based on the attribute values related to the merge attribute of information included in each received search result; and providing the merged search results to the client.

5. The method as described in claim 4, wherein the merging of the received search results based on the attribute values related to the merge attribute of information included in each received search result includes:

selecting a second specified number of attribute values from the attribute values related to the merge attribute of information included in the each received search result; and for each selected attribute value, merging the selected attribute value into one search result.

6. The method as described in claim 5, wherein the selecting of the second specified number of attribute values from the attribute values related to the merge attribute of information included for each received search result comprises:

ranking the information according to a preset ranking rule;

for each received search result, determining a first piece of information from the information included in the each search result;

ranking the determined first pieces of information based on a preset ranking rule;

ranking the attribute values related to the merge attribute of the determined first pieces of information based on the ranking results of the determined first pieces of information; and selecting the second specified number of attribute values based on the ranking results of the attribute values.

7. The method as described in claim 1, further comprising:

before the providing of the received search results:

ranking the information based on a preset ranking rule;

for each obtained search result, determining a first piece of information of the information contained in the each search result;

selecting a second specified number of attribute values of the merge attribute of the information relating to the search condition;

selecting from the information relating to the search condition the information relating to the related attribute values; and merging the selected information based on the attribute values related to the merge attribute of the selected information to be the merged search results as the obtained search results.

8. The method as described in claim 7, wherein the selecting of the second specified number of attribute values from the merge attribute of the information relating to the search condition includes:

ranking the information relating to the search condition based on a preset ranking rule;

ranking the attribute values related to the merge attribute of the information relating to the search condition based on the ranked received information; and selecting the second specified number of attribute values based on the ranking of the attribute values.

9. The method as described in claim 7, wherein the providing of the received search results to the client includes:

merging the received search results based on the attribute values related to the merge attribute of the information included in the received search results; and providing the merged search results to the client.

10. The method as described in claim 1, further comprises:

before the providing of the obtained search results:

for each obtained search result:

ranking information included in the each search result based on a preset ranking rule;

determining a first piece of information up to a third specified quantity of the information included in the each search result; and deleting information other than the determined information included in the each search result.

11. The method as described in claim 1, further comprises:

before the providing of the received search results to the client:

for each obtained search result:

ranking the information included in the each search result based on a preset ranking rule;

determining a first piece of information up to a third specified quantity of the information included in the each search result; and deleting information other than the determined information contained in the each search result.

12. The method as described in claim 1, wherein the information stored in the plurality of processing servers is pre-allocated to the pluality of processing servers based on information identifiers of the information.

13. The method as described in claim 1, wherein the information stored in the processing servers is pre-allocated to the plurality of processing servers based on the attribute values related to the merge attribute of the information, the attribute values related to merge attribute of the information are the same being allocated to the same processing server.

14. The method as described in claim 1, wherein the merging of the information relating to the search condition comprises:

selecting a first specified number of attribute values from the attribute values related to the merge attribute of the information relating to the search condition, the first specified number being two or more, the first specified number of attribute values from the attribute values including a first attribute value and a second attribute value;

determining the first found information from the information relating to the search condition based on the first attribute value; and determining the second found information from the information relating to the search condition based on the second attribute value.

15. The method as described in claim 1, wherein the selecting of the processing server of the plurality of processing servers comprises:
obtaining a modulus of the identifier of information relating to the search condition and the number relating to the plurality of processing servers, the modulus relating to the selected processing server.

16. A processing server, comprising:
at least one processor configured to:
receive, from a merging server, an information search request including a search condition sent by a client, the search condition including search keywords, wherein the merging server selects a processing server of a plurality of processing servers based on an identifier of information relating to the search condition and a number relating to the plurality of processing servers, and forwards the information search request to the selected processing server for the selected processing server to:
divide the search keywords into a plurality of search keyword units;
look up, in a list of search keyword units, an information identifier corresponding to each search keyword unit, the information identifier corresponding to information content; and
determine whether a position of a search keyword unit within the information content matches a position of the search keyword unit of a search keyword;
wherein:
in the event that the position of a search keyword unit within the information content matches the position of the search keyword unit of the search keyword, the information content is regarded as final found information content; and
in the event that the position of a search keyword unit within the information content does not match the position of the search keyword unit of the search keyword, the information content is not regarded as the final found information content;
search within the processing server for information relating to the search condition;
determine a merge attribute based on the information relating to the search condition relating to the search condition, the merge attribute having related attribute values, the related attribute values including first and second attribute values, the first attribute value being different from the second attribute value, wherein the determining of the merge attribute comprises to pre-establish a designated attribute from an attribute of the information relating to the search condition to be the merge attribute;
merge the information relating to the search condition based on the determined merge attribute of the information relating to the search condition to obtain search results, comprising to:
determine a first found information from the information relating to the search condition based on the first attribute value;
determine a second found information from the information relating to the search condition based on the second attribute value, the first found information being different from the second found information; and
merge the first found information and the second found information into a search result; and
provide the obtained search results to the client to be displayed; and
a memory coupled to the at least one processor and configured to provide the at least one processor with instructions.

17. A merging server, comprising:
at least one processor configured to:
receive an information search request including a search condition from a client, wherein the search condition includes search keywords;
forward the information search request to a plurality of processing servers to search for information relating to the search condition, comprising to:
select a processing server of the plurality of processing servers based on an identifier of information relating to the search condition and a number relating to the plurality of processing servers; and
forward the information search request to the selected processing server for the selected processing server to:
divide the search keywords into a plurality of search keyword units;
look up, in a list of search keyword units, an information identifier corresponding to each search keyword unit, the information identifier corresponding to information content; and
determine whether a position of a search keyword unit within the information content matches a position of the search keyword unit of a search keyword;
wherein:
in the event that the position of a search keyword unit within the information content matches the position of the search keyword unit of the search keyword, the information content is regarded as final found information content; and
in the event that the position of a search keyword unit within the information content does not match the position of the search keyword unit of the search keyword, the information content is not regarded as the final found information content;
receive search results sent by the plurality of processing servers;
merge the received search results based on attribute values, the related attribute values including first and second attribute values related to a merge attribute of information included in each received search result, the first attribute value being different from the second attribute value, wherein the merge attribute is determined based on a pre-established designated attribute of the information relating to the search condition, and wherein the merging of the received search results comprises to:
determine first found information from the information relating to the search condition based on the first attribute value;
determine second found information from the information relating to the search condition based on the second attribute value, the first found information being different from the second found information; and merge the first found information and the second found information into a search result; and provide the obtained search results to the client to be displayed; and a memory coupled to the at least one processor and configured to provide the at least one processor with instructions.

18. A computer program product for providing information, the computer program product being embodied in a non-transitory computer readable storage medium and comprising computer instructions for:

receiving an information search request including a search condition sent by client, wherein the search condition includes search keywords;

forwarding the information search request to a plurality of processing servers to search for information relating to the search condition, comprising:

selecting a processing server of the plurality of processing servers based on an identifier of information relating to the search condition and a number relating to the plurality of processing servers; and forwarding the information search request to the selected processing server for the selected processing server to:

divide the search keywords into a plurality of search keyword units;

look up, in a list of search keyword units, an information identifier corresponding to each search keyword unit, the information identifier corresponding to information content; and determine whether a position of a search keyword unit within the information content matches a position of the search keyword unit of a search keyword;

wherein:

in the event that the position of a search keyword unit within the information content matches the position of the search keyword unit of the search keyword, the information content is regarded as final found information content; and in the event that the position of a search keyword unit within the information content does not match the position of the search keyword unit of the search keyword, the information content is not regarded as the final found information content;

determining a merge attribute based on the information relating to the search condition relating to the search condition, the merge attribute having related attribute values, the attribute values including first and second attribute values, the first attribute value being different from the second attribute value, wherein the determining of the merge attribute comprises pre-establishing a designated attribute from an attribute of the information relating to the search condition to be the merge attribute;

merging the information relating to the search condition based on the determined merge attribute of the information relating to the search condition to obtain search results, comprising:

determining first found information from the information relating to the search condition based on the first attribute value;

determining second found information from the information relating to the search condition based on the second attribute value, the first found information being different from the second found information; and merging the first found information and the second found information into a search result; and providing the obtained search results to the client to be displayed.

* * * * *